United States Patent
Wang

(10) Patent No.: US 10,244,590 B2
(45) Date of Patent: Mar. 26, 2019

(54) VISIBLE LIGHT COMMUNICATION SYSTEM-ON-A-CHIP

(71) Applicant: THE REGENTS OF THE UNIVERSITY OF CALIFORNIA, Oakland, CA (US)

(72) Inventor: Albert Wang, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/750,177

(22) PCT Filed: Mar. 10, 2017

(86) PCT No.: PCT/US2017/021862
§ 371 (c)(1),
(2) Date: Feb. 3, 2018

(87) PCT Pub. No.: WO2018/063438
PCT Pub. Date: Apr. 5, 2018

(65) Prior Publication Data
US 2019/0014628 A1    Jan. 10, 2019

Related U.S. Application Data

(60) Provisional application No. 62/417,127, filed on Nov. 3, 2016, provisional application No. 62/401,811, filed
(Continued)

(51) Int. Cl.
*H01L 33/00* (2010.01)
*H05B 33/08* (2006.01)
(Continued)

(52) U.S. Cl.
CPC .......... *H05B 33/0806* (2013.01); *G05F 1/10* (2013.01); *H01L 23/31* (2013.01); *H01L 25/07* (2013.01);
(Continued)

(58) Field of Classification Search
CPC ..... H05B 33/0806; H01L 33/18; H01L 33/48; H01L 23/31; H01L 25/07; H04B 10/50; H04B 10/116; H04B 10/60; G05F 1/10
(Continued)

(56) References Cited

U.S. PATENT DOCUMENTS 5,326,991 A     7/1994  Takasu
2011/0002695 A1  1/2011  Choi et al.
(Continued)

FOREIGN PATENT DOCUMENTS

CN     2014/154023 A1    10/2014

OTHER PUBLICATIONS

Dong, Z. et al. An Integrated Transmitter for LED-Based Visible Light Communication and Positioning System in a 180nm BCD Technology [online], Dec. 11, 2014 [retrieved on May 15, 2017]. Retrieved from internet:<URL: http://ieeexplore.ieee.org/documents/6981291/>.
(Continued)

*Primary Examiner* — Vu A Vu
(74) *Attorney, Agent, or Firm* — Ivan Posey, Esq.; Leech Tishman Fuscaldo & Lampl

(57) ABSTRACT

This disclosure relates to visible light communication (VLC) system-on-a-chip (SoC) systems/methods and VLC system-in-a-package (SiP) systems/methods. A VLC SoC system may include an integrated circuit comprising a VLC encoder and an LED driver fabricated on a first portion of a silicon substrate and an LED fabricated in a compound semiconductor selectively grown on a second portion of the silicon
(Continued)

substrate. A VLC SiP system may include an integrated circuit comprising a VLC encoder and an LED driver fabricated on a silicon substrate and an LED fabricated in a compound semiconductor. The integrated circuit and the LED may be packaged in a SiP module. Interconnects may be formed between the integrated circuit and the LED.

36 Claims, 25 Drawing Sheets

Related U.S. Application Data on Sep. 29, 2016, provisional application No. 62/401,818, filed on Sep. 29, 2016, provisional application No. 62/401,837, filed on Sep. 29, 2016.

(51) Int. Cl.

| | |
|---|---|
| *G05F 1/10* | (2006.01) |
| *H01L 25/07* | (2006.01) |
| *H01L 23/31* | (2006.01) |
| *H04B 10/60* | (2013.01) |
| *H01L 33/48* | (2010.01) |
| *H04B 10/116* | (2013.01) |
| *H04B 10/50* | (2013.01) |
| *H01L 33/18* | (2010.01) |

(52) U.S. Cl.
CPC .............. *H01L 33/18* (2013.01); *H01L 33/48* (2013.01); *H04B 10/116* (2013.01); *H04B 10/50* (2013.01); *H04B 10/60* (2013.01)

(58) Field of Classification Search
USPC .......................................................... 257/80
See application file for complete search history.

(56) References Cited

U.S. PATENT DOCUMENTS

| | | | |
|---|---|---|---|
| 2012/0001567 A1* | 1/2012 | Knapp | H04L 12/282 |
| | | | 315/291 |
| 2014/0226977 A1* | 8/2014 | Jovicic | H04B 10/116 |
| | | | 398/26 |
| 2015/0341113 A1 | 11/2015 | Krug | |
| 2016/0323968 A1* | 11/2016 | Yue | H01L 25/167 |

OTHER PUBLICATIONS

USPTO, International Search Report and Written Opinion of the International Searching Authority issued in parent International Patent Application No. PCT/US2017/021862 dated May 24, 2017, 9 pages.

\* cited by examiner

Transmitter circuit functions: LED sends out light signals

Receiver circuit functions: a PD receives light signals and process it

VISIBLE LIGHT COMMUNICATION SYSTEM-ON-A-CHIP

CROSS-REFERENCE TO RELATED APPLICATIONS

This application is a 371 national stage of International Patent Application No. PCT/US2017/021862, which claims the benefit of U.S. Provisional Patent Application No. 62/401,811 filed Sep. 29, 2016; U.S. Provisional Patent Application No. 62/401,818, filed Sep. 29, 2016; U.S. Provisional Patent Application No. 62/401,837, Sep. 29, 2016; and U.S. Provisional Patent Application No. 62/417,127, filed Nov. 3, 2016, the entire contents of all of which are hereby expressly incorporated by reference.

TECHNICAL FIELD

This disclosure relates generally to visible light communication, and more specifically to visible light communication system-on-a-chip/methods and visible light communication system-in-a-package/methods.

BACKGROUND

Visible light communication provide an alternative communication method to radio frequency based wireless technologies. Improving manufacture and operation of visible light communication devices are desirable.

SUMMARY

One aspect of the disclosure relates to a visible light communication (VLC) system-on-a-chip (SoC) system and methods for making a VLC SoC system. A VLC SoC system may include an integrated circuit (IC) comprising a VLC encoder and an LED driver fabricated on a first portion of a silicon substrate, and an LED fabricated in a compound semiconductor selectively grown on a second portion of the silicon substrate. In some implementations, the VLC SoC system may be a single chip IC.

A VLC SoC system may comprise an integrated circuit fabricated on a first portion of a silicon substrate and an LED fabricated in a compound semiconductor selectively grown on a second portion of the silicon substrate. The LED may be configured as a VLC transmitter. The compound semiconductor may be selectively grown on the second portion of the silicon substrate by (1) using a photo mask on the silicon substrate to define an opening; (2) depositing seeds into the opening; and (3) selectively growing the compound semiconductor in the opening.

In some implementations, the compound semiconductor may comprise a direct bandgap semiconductor. In some implementations, the compound semiconductor may comprise GaN. In some implementations, a buffer layer may be grown between the compound semiconductor and the second portion of the silicon substrate.

The integrated circuit may comprise a VLC encoder and an LED driver. The VLC encoder may be configured to encode a VLC signal. In some implementations, the VLC encoder may comprise a Manchester encoder. The LED driver may be configured to drive the LED to emit visible light in accordance with the VLC signal.

In some implementations, the integrated circuit may further comprise a serializer for serializing the VLC signal. In some implementations, the integrated circuit may further comprise a pre-equalizer featuring an overshoot/undershoot circuit configured to accelerate charging and discharging of the LED, hence to enhance its modulation bandwidth. In some implementations, the integrated circuit may further comprise an active feedback based ambient light cancellation circuit. The active feedback based ambient light cancellation circuit may comprise a low pass filter, an error amplifier, and an NMOSFET. The active feedback based ambient light cancellation circuit may comprise an active feedback transimpedance amplifier (TIA) ambient light cancellation circuit.

In some implementations, the VLC SoC system may further comprise a photodetector (PD) fabricated in the compound semiconductor selectively grown on the second portion of the silicon substrate. In some implementations, the photodetector may be fabricated directly on the silicon substrate. The photodetector may be configured as a VLC receiver to receive the VLC signal, and the integrated circuit may be configured to process the VLC signal received by the photodetector.

One aspect of the disclosure relates to a VLC system-in-package (SiP) system and methods for making a VLC SiP system. A VLC SiP system may include an integrated circuit comprising a VLC encoder and an LED driver fabricated on a silicon substrate, and an LED fabricated in a compound semiconductor. The integrated circuit and the LED may be packaged in a SiP module. Interconnects may be formed between the integrated circuit and the LED.

A VLC SiP system may comprise an integrated circuit fabricated on a silicon substrate and an LED fabricated in a compound semiconductor. The LED may be configured as a VLC transmitter. The integrated circuit and the LED may be packaged in a SiP module. In some implementations, the SiP module may be packaged using a flip-chip method. In some implementations, the SiP module may be packaged using a stacked-chip method. Interconnects may be formed between the integrated circuit and the LED. In some implementations, the interconnects may comprise through-silicon vias and an interposer layer.

In some implementations, the compound semiconductor may comprise a direct bandgap semiconductor. In some implementations, the compound semiconductor may comprise GaN.

The integrated circuit may comprise a VLC encoder and an LED driver. The VLC encoder may be configured to encode a VLC signal. In some implementations, the VLC encoder may comprise a Manchester encoder. The LED driver may be configured to drive the LED to emit visible light in accordance with the VLC signal.

In some implementations, the integrated circuit may further comprise a serializer for serializing the VLC signal. In some implementations, the integrated circuit may further comprise an overshoot/undershoot circuit configured to accelerate charging and discharging of the LED in order to enhance the LED modulation bandwidth. In some implementations, the integrated circuit may further comprise an active feedback based ambient light cancellation circuit. The active feedback based ambient light cancellation circuit may comprise a low pass filter, an error amplifier, and an NMOSFET. The active feedback based ambient light cancellation circuit may comprise an active feedback TIA ambient light cancellation circuit.

In some implementations, the VLC SiP system may further comprise a photodetector fabricated in the compound semiconductor. In some implementations, the photodetector may be fabricated on the silicon substrate. The photodetector may be configured as a VLC receiver to receive the VLC signal, and the integrated circuit may be configured to process the VLC signal received by the photodetector.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Energy-efficient solid-state white LED illuminating devices are making inroads in the lighting market, and their ability to switch ON/OFF at high speed (e.g., tens of MHz) without flickering enables wireless visible light communication at very high data rates. VLC communications have many unique advantages over traditional RF-based wireless technologies: First, the unlicensed and unrestricted optical spectrum offers a bandwidth up to 300 THz, orders of magnitude wider than the RF spectrum. This makes wireless streaming at multiple giga-bits per second (Gbps) possible. Second, visible light is largely radiation harmless. This allows more emission power to boost data rates without risking human health. Third, VLC does not penetrate through walls and provides security by localizing the area within which data transmitted via VLC may be received/sent. Fourth, VLC can co-exist with and complement existing RF technology. Fifth, VLC devices may be built with lower costs than multi-GHz RF devices.

A VLC system consists of modulated LEDs (e.g., lamps) for broadcasting and user terminals (e.g., smartphones with built-in LED and PD) as optical transceivers to realize full-duplex optical wireless streaming. Essentially, the VLC may be built upon existing LED lighting infrastructure, enabling many new applications. For example, a person may turn on a "light" at home and receive VLC-based wireless streaming of data. A VLC system may be used for visible light positioning (VLP), where positions of persons/objects are determined based on communications via the VLC system.

Figure 1:
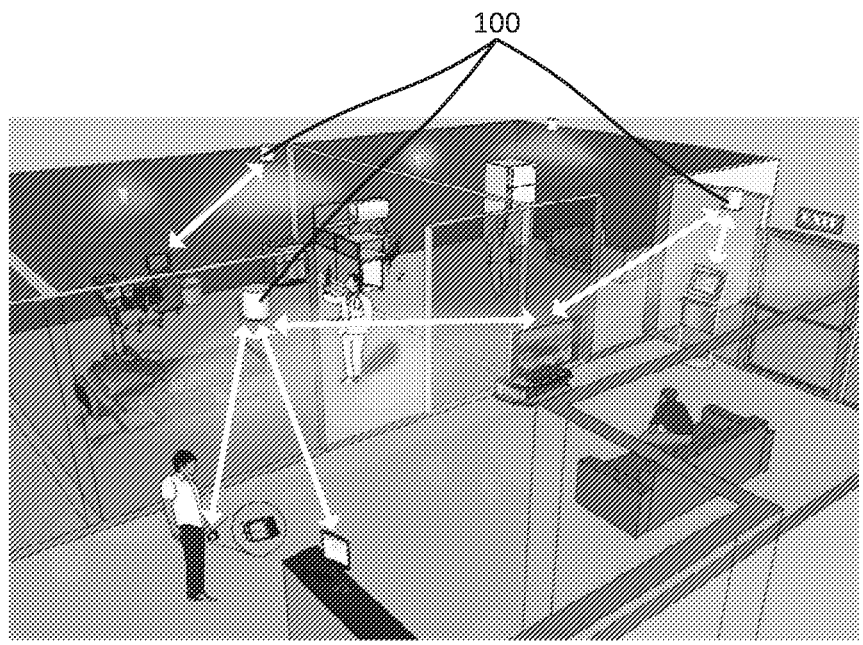
FIGS. 1-2 illustrate example VLC/VLP scenarios in accordance with some implementations of the disclosure.
Figure 2:
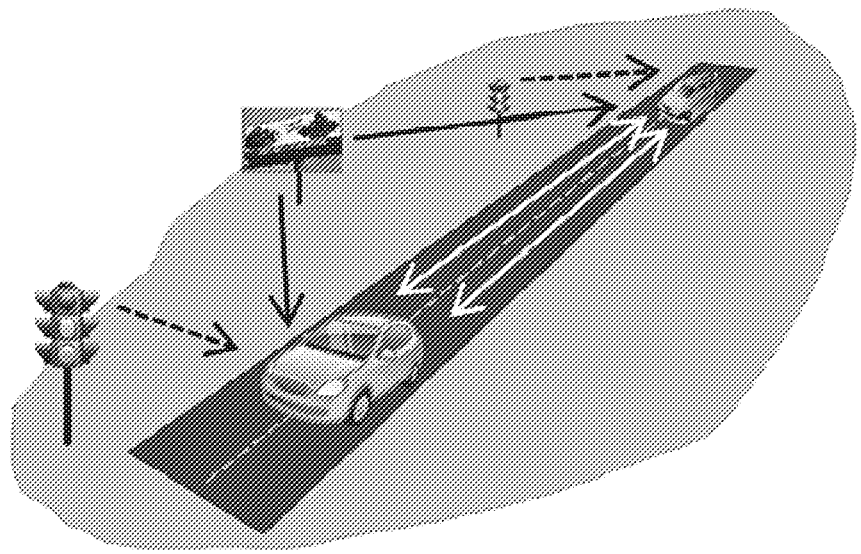

FIG. 1 illustrates an example VLC scenario in a hospital where RF devices may be prohibited. In this scenario, persons within the hospital (e.g., doctors, nurses, staff, patients, visitors) may send/receive data via VLC devices 100. Persons may send/receive data via VLC devices 100 when they (the devices carried by the persons) are within visible sight of VLC receivers/transmitters (e.g., VLC devices 100). FIG. 2 illustrates one VLC/VLP scenario for smart traffics. In FIG. 2, VLC systems may be used for car-to-car communication, smart traffic control, car-to-car collision avoidance (e.g., using VLC to determine distance between cars), and signage data broadcasting.

Existing VLC systems use discrete electronic components to build the required electronic circuits, which are used to drive LED devices. This Lego-type visible light communication testbed has numerous disadvantages, such as large size, complex electronic boards, low performance, low reliability and high costs. These visible light testbeds may not be compatible with mobile terminals, such as a smartphone or a tablet.

Boosting data rates of LEDs (e.g., white LEDs) are desirable. To do so, a single-LED and single-PD of a visible light transceiver system may be replaced by a large LED and PD array. Further, a normal discrete LED may be replaced by embedded LED (e.g., the built-in LED flashlight device in a mobile phone) and a PD may be replaced by an imager device (e.g., the CMOS or CCD imager built in a smartphone). For handheld devices, SiP or SoC that integrates all electronic circuits with the LED and PD optical devices may be designed to make VLC system with full opto-electronic (O/E) integration. This may provide VLC systems with small footprint, very high performance, very high reliability and very low costs.

FIGS. 3A-3D show an example VLC system architecture for both host-to-slave broadcasting (e.g., LED to smartphone) and peer-to-peer full-duplex transceiving (e.g., smartphone to tablet) application modes. In a host-to-slave broadcasting mode, computer 300 uses an LED array 302 to broadcast data to smartphone 330 or tablet 360 (via a PD Array/Imager 334 or PD Array/Imager 362). In a peer-to-peer full-duplex transceiving mode, smartphone 330 or tablet 360 may communicate with another smartphone 330 or tablet 360 (via LED array 332 and PD array 334/Imager 362). Different types of optical sensors may be used. For example, a single PD, a large PD array and a CMOS/CCD imager may be used to achieve high data rate.

Figure 3A:
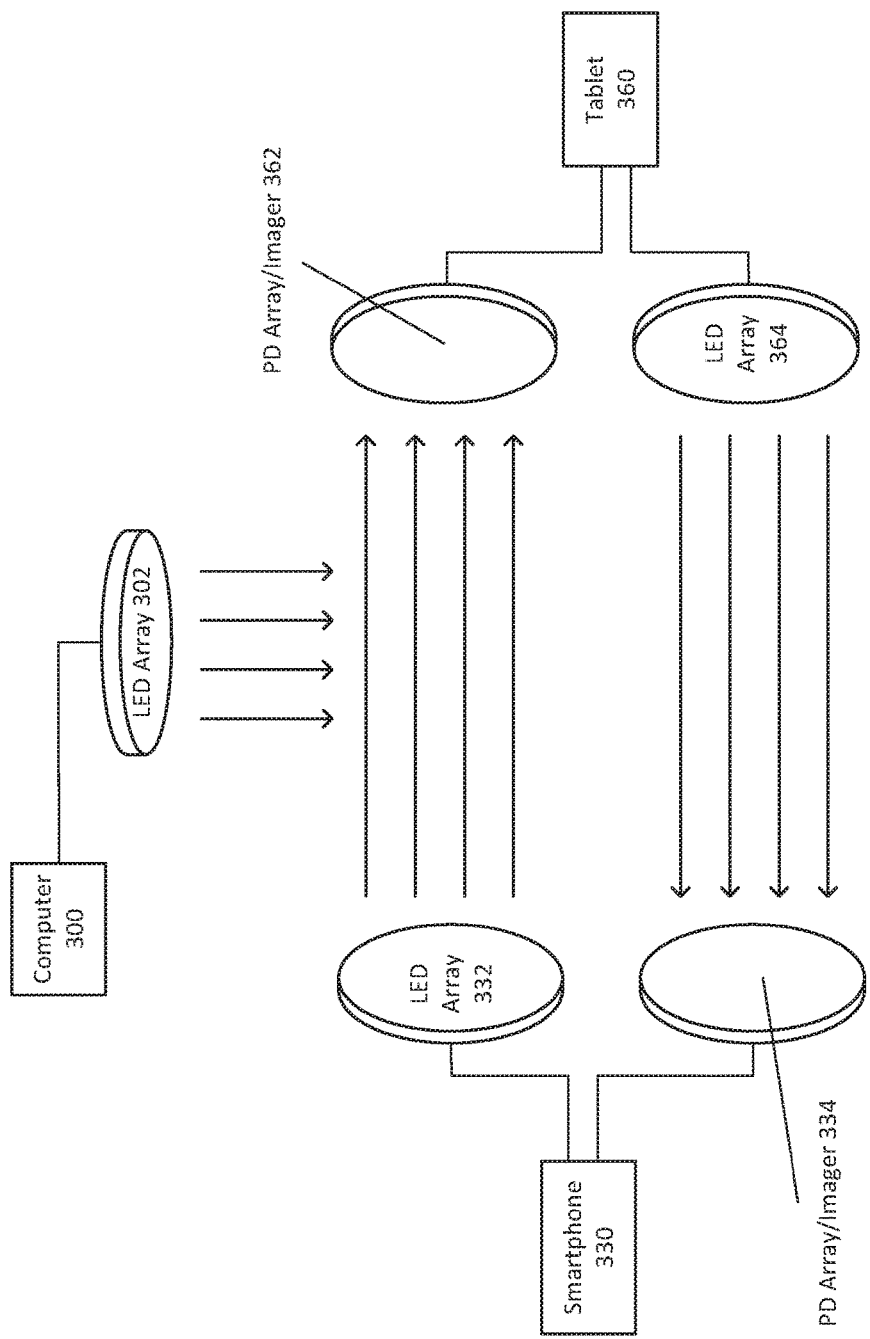
FIGS. 3A-3D illustrate example VLC system architectures in accordance with some implementations of the disclosure.
Figure 3B:
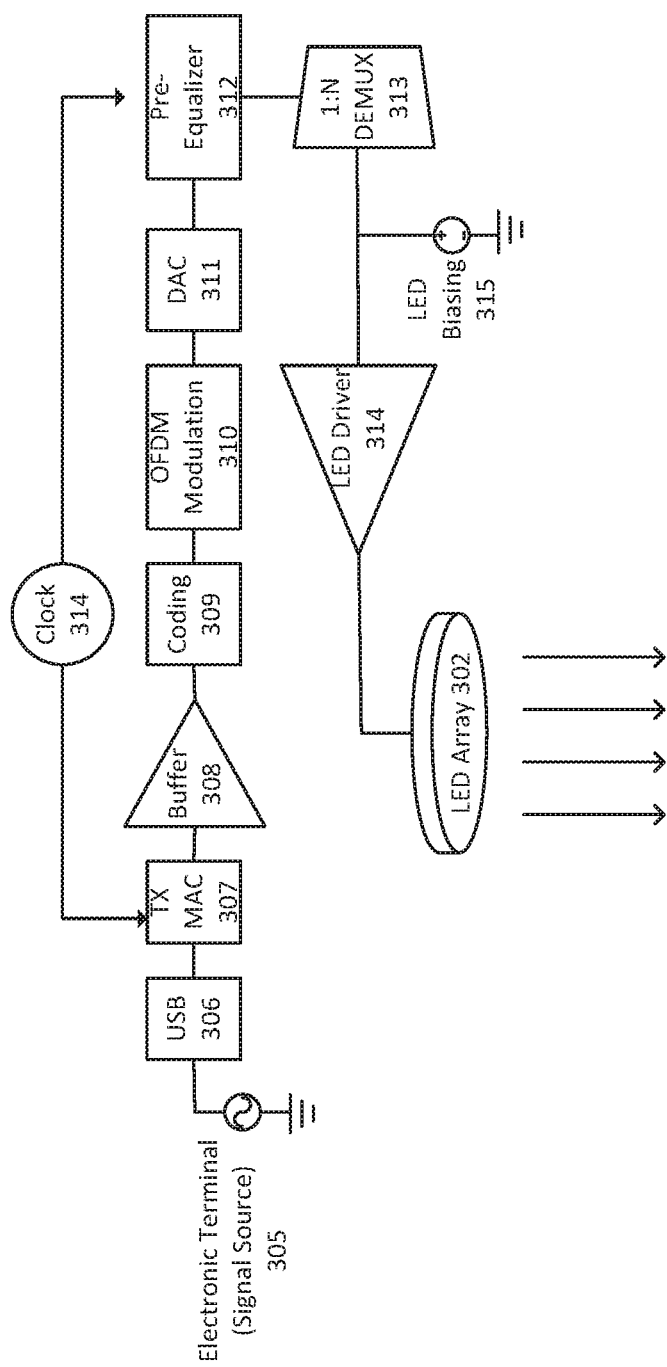
Figure 3C:
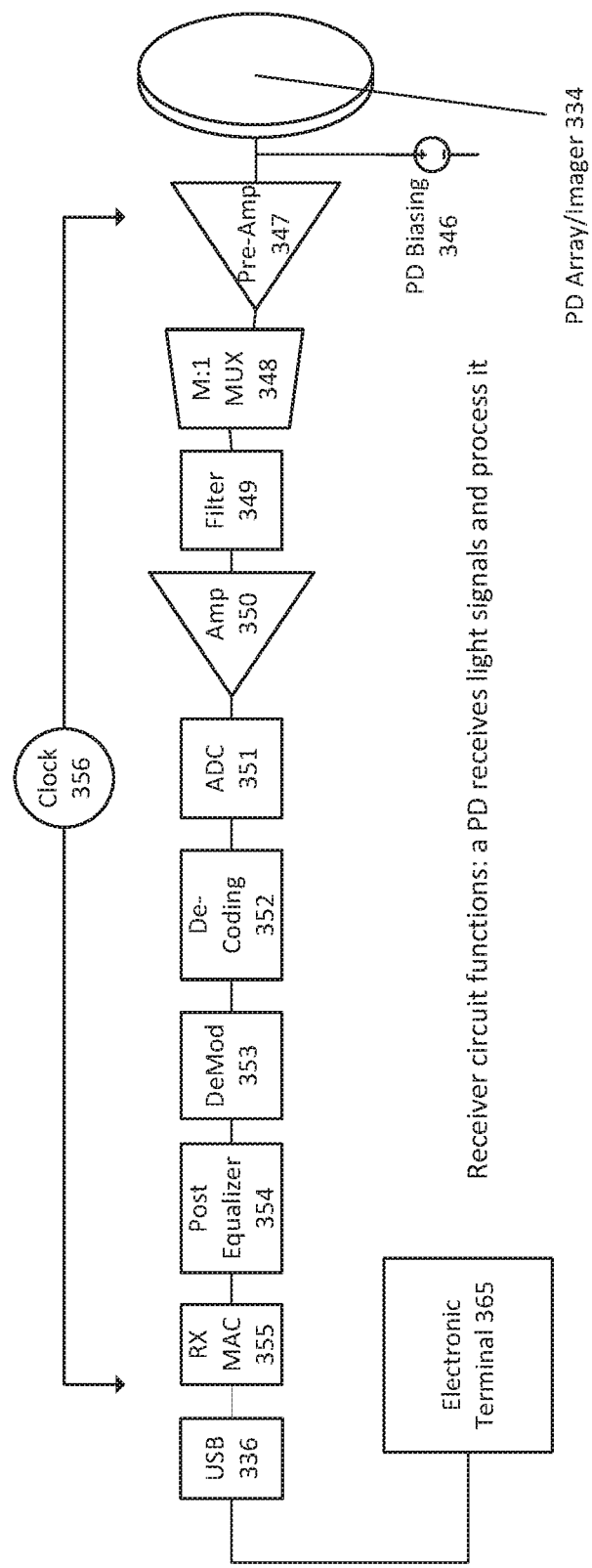
Figure 3D:
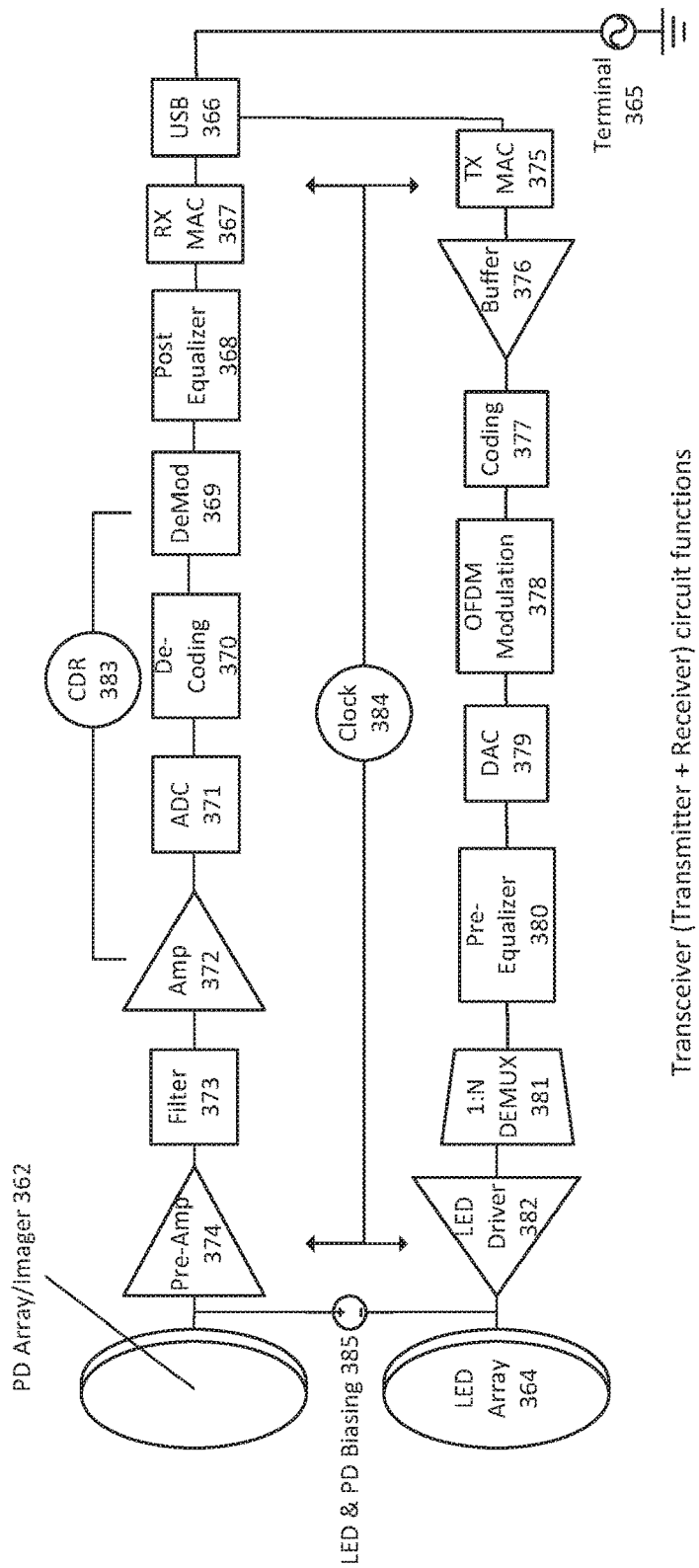

FIG. 3B shows a typical transmitter circuit architecture for broadcasting light signals, which may include LED array 302, an electronic terminal as a signal source 305 (e.g., computer 300, or a part of computer 300), USB 306, TX MAC 307, buffer 308, coding 309, OFDM modulation 310, DAC 311, pre-equalizer 312, 1:N DEMUX 313, LED driver 314, LED biasing 315, and/or other components. FIG. 3C shows a typical receiver circuit architecture for receiving light signals, which may include a PD array/imager 334, PD biasing 346, pre-amp 347, M:1 MUX 348, filter 349, amp 350, ADC 351, de-coding 352, DeMod 353, post equalizer 354, RX MAC 355, clock 356, an electronic terminal 365 as a display device (e.g., smartphone 330 or tablet 360) or a signal source, and/or other components. FIG. 3D is a typical transceiver circuit architecture, consisting of a transmitter and a receiver, which includes an electronic terminal 365 (e.g., computer 300, smartphone 330 or tablet 360), a PD array/imager 362, LED array 364, USB 366, RX MAC 367, post equalizer 368, DeMod 369, de-coding 370, ADC 371, amp 372, filter 373, pre-amp 374, TX MAC 375, buffer 376, coding 377, OFDM modulation 378, DAC 379, pre-equalizer 380, 1:N DEMUX 381, LED driver 382, CDR 383, clock 384, LED and PD biasing 385, and/or other components.

Buffers, coding and decoding, OFDM modulation and demodulation provide signal processing functions. Pre-equalizer may provide for wider LED modulation bandwidth. Driver may provide for LED driving current, DC biasing may provide DC biasing for LED, PD and imager, and integrated analog-to-digital convertor (ADC) and digital-to-analog convertor (DAC) provide signal conversion between analog and digital signals, CDR (clock and data recovery) circuit is used to recover the data and clocks from the received signals, and clock circuit provide global clock synchronization. Pre-amplifier, main amplifier and high/low pass filters provide signal amplification and filtering for the signals received. A MUX circuit may be used to handle the received parallel signals. MAC blocks may be used for access control for multi-users. LVDS (low voltage differential signaling) may serve to remove background noises and USB interface may be used by the electronic terminals.

To replace the existing discrete-component-based Lego-type VLC systems, fully integrated SiP and SoC VLC systems are provided. Such systems are particularly suitable for mobile systems. Physically, a VLC system may include two parts: photonic signaling and electronic processing. Photonic functions may be realized by white (or color) LED transmitting and PD receiving. Theoretically, popular low-cost CMOS/CCD imagers may replace PDs to greatly improve SNR (signal-to-noise ratio) and data rate (e.g., up to multiple Gbps). The drawbacks for using the commercial off the shelf (COTS) Lego electronic components for making VLC systems include: poor electronic performance such as high noise in pre-amplifier, very large and complex electronic board and size, poor reliability, and high costs. Ideally, the LEDs, PDs and imagers should be integrated with the ICs to realize full O/E integration and to deliver the VLC SiP and/or SoC for the best system performance. For example, most LED are made in wide bandgap GaN, while ICs use Si. Several techniques are proposed to realize SiP and SoC for VLC systems.

A VLC SoC system may include an IC comprising a VLC encoder and an LED driver fabricated on a first portion of a silicon substrate, and an LED fabricated in a compound semiconductor selectively grown on a second portion of the silicon substrate. In some implementations, the VLC SoC system may be a single chip IC. LED and PD may be integrated into a one-unit LED/PD pair (e.g., transmitter and receiver), with each optimized for its own functions, i.e., LED for high power light emission, and PD for high sensitivity.

Figure 4:
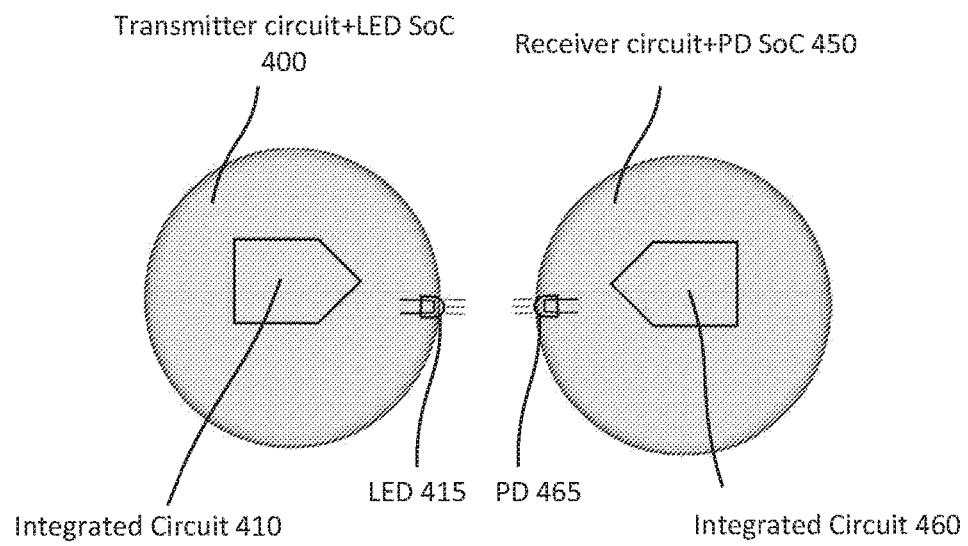
FIG. 4 illustrates an example single-chip SoC implementation for VLC system in accordance with some implementations of the disclosure.

A fully integrated single-chip VLC SoC system may integrate electronics and optical devices onto the same substrate (e.g., Silicon wafer). For example, as shown in FIG. 4, transmitter circuit+LED SoC 400 may include IC 410 made in a Si substrate and LED 415 made in a compound semiconductor grown selectively on top of the same Si substrate. Receiver circuit+PD SoC 450 may include IC 460 made in a Si substrate and PD 465 made in a compound semiconductor grown selectively on top of the same Si substrate. LED 415 and/or PD 465 may be made in a compound semiconductor directly through techniques like selective growth of compound semiconductor materials on silicon substrate to enhance optical performance. Further, the transmitter circuit+LED SoC 400 and receiver circuit+PD SoC 450 may be made in the same Si substrate to form a single-chip SoC consisting of both the transmitter and receiver blocks.

A VLC transmitter SiP system may comprise an IC fabricated on a silicon substrate, and an LED fabricated from a compound semiconductor, separately. In some implementations, the compound semiconductor may comprise a direct bandgap semiconductor. In some implementations, the compound semiconductor may comprise GaN. The LED may be configured as a VLC transmitter. The two separate IC and the LED may be packaged in one SiP module. In some implementations, the SiP module may be packaged using a flip-chip method. In some implementations, the SiP module may be packaged using a stacked-chip method. Interconnects may be formed between the IC and the LED. In some implementations, the interconnects may comprise through-silicon vias and an interposer layer.

Figure 5:
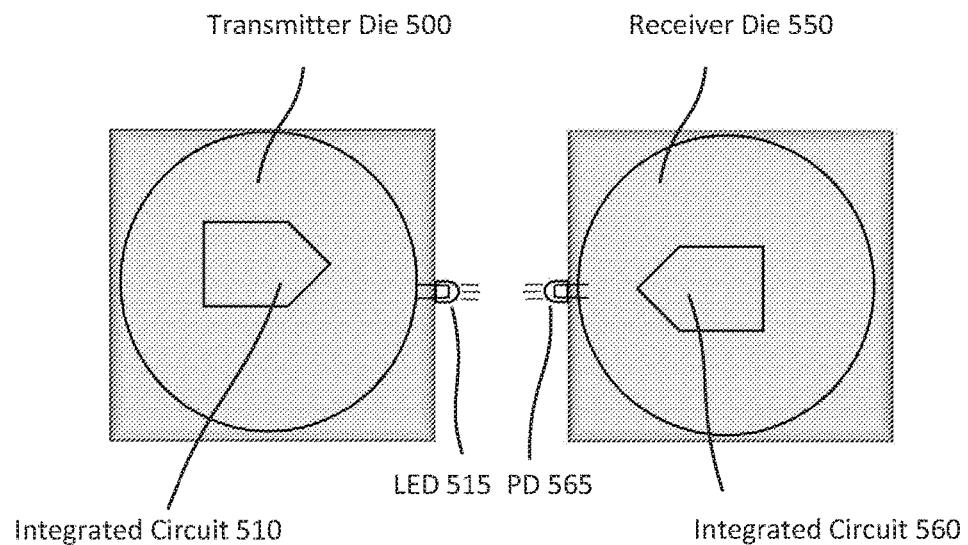
FIG. 5 illustrates an example SoC+SiP implementation for VLC system in accordance with some implementations of the disclosure.

A VLC SiP system may include an IC comprising a VLC encoder and an LED driver circuit fabricated on a silicon substrate, and an LED fabricated from a compound semiconductor, separately. The IC and the LED may be packaged in one SiP module. Interconnects may be formed between the IC and the LED. Two chips may be used to provide different components of the system. A first chip may integrate electronics and a second chip may combine the optical devices (e.g., LED and PD). FIG. 5 shows an example SoC+SiP implementation for a VLC system. Transmitter die 500 may include IC 510, which is a SoC for the transmitting circuit, and LED 515. The two separate IC 510 and LED 515 dies may be combined together into one SiP module to form a SoC+SiP transmitter unit. Receiver die 550 may include IC 560 and PD 565 made in the same silicon substrate (hence, a receiver SoC). Further, the transmitter unit and receiver unit may be combined together into one SiP module to form the SoC+SiP transceiver system (transmitter+receiver). A chip formed from transmitter die 500 may be combined with a chip formed from receiver die 550 using connecting techniques, such as flip-chip, stacked-chip, through-Si-via (TSV), interposer, and/or other techniques, to electrically connect the electronics circuitries with the optical devices. Similarly, an IC chip 510 and LED chip 515 may be connected in the same way to form a transmitter SiP module. For users, the VLC system looks like a one-package component, i.e., a SiP system. In some implementations, the PD may be made of Si. In some implementations, the PD may be made of a compound semiconductor.

Figure 6:
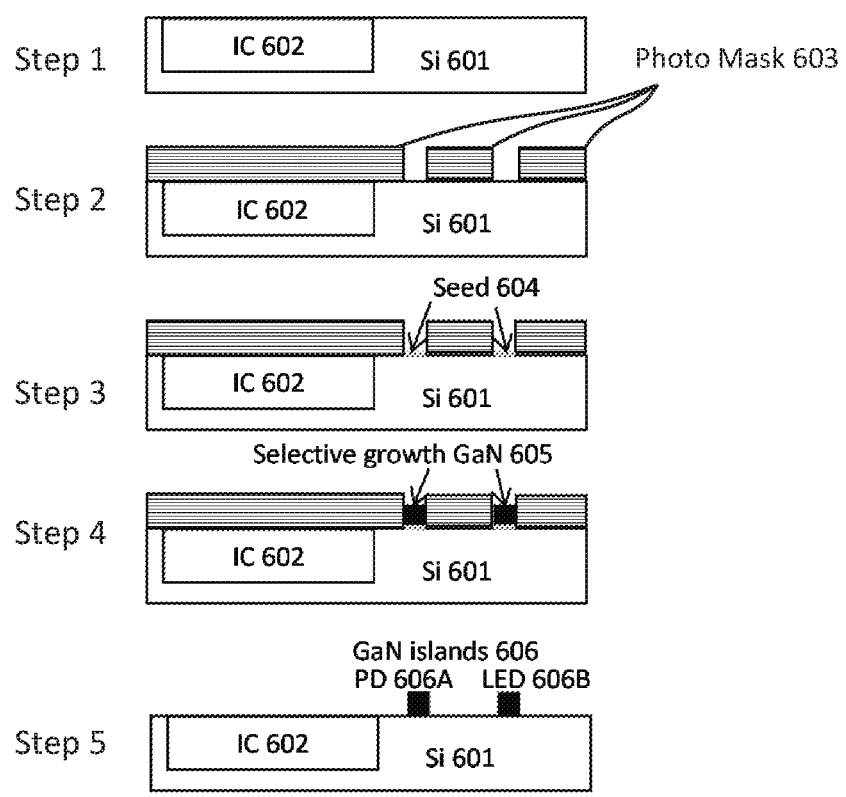
FIG. 6 illustrates an example selective GaN growth process flow in accordance with some implementations of the disclosure.

FIG. 6 illustrates a selective GaN growth process flow for fabricating electronics/optical devices: First, a circuit is made as an IC 602 in a Si substrate 601. Next, a photo mask 603 is used to make the patterns for growing GaN for LED and/or PD devices. Seeds 604 are deposited into the openings of the photo masks 603 where the LED and/or PD devices are to be made. Then, GaN 605 will be selectively grown inside the openings. After removal of the photo mask 603, a set of GaN islands 606 will be formed to make the PD device 606A and the LED device 606B, which are integrated with the IC 602 on the Si substrate 601. This results in an IC+LED+PD SoC. Alternatively, if CMOS/CCD imagers will be used to serve as a PD, the CMOS/CCD imagers may be made directly in Si wafer and be integrated with the IC 602 in the same Si substrate naturally.

Figure 7B:
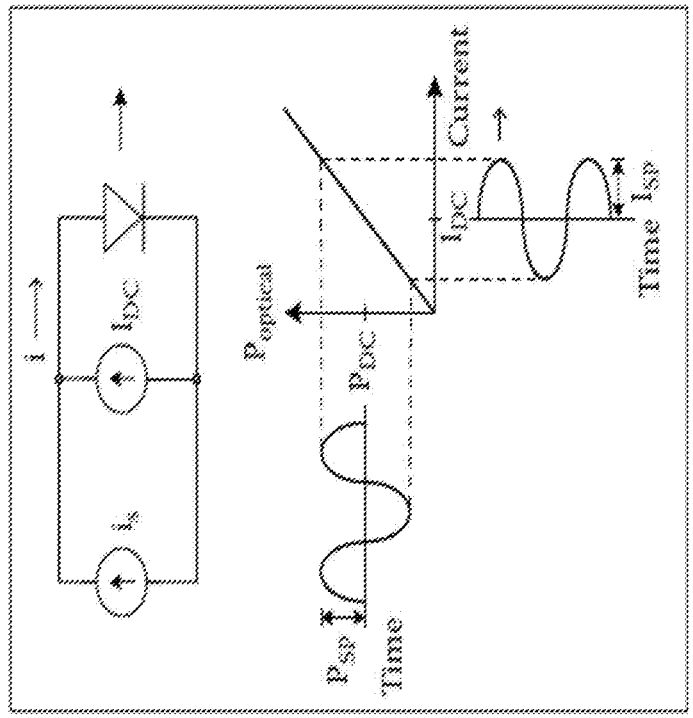
FIGS. 7A-7B illustrate example LED modulation mechanisms in accordance with some implementations of the disclosure.
Figure 7A:
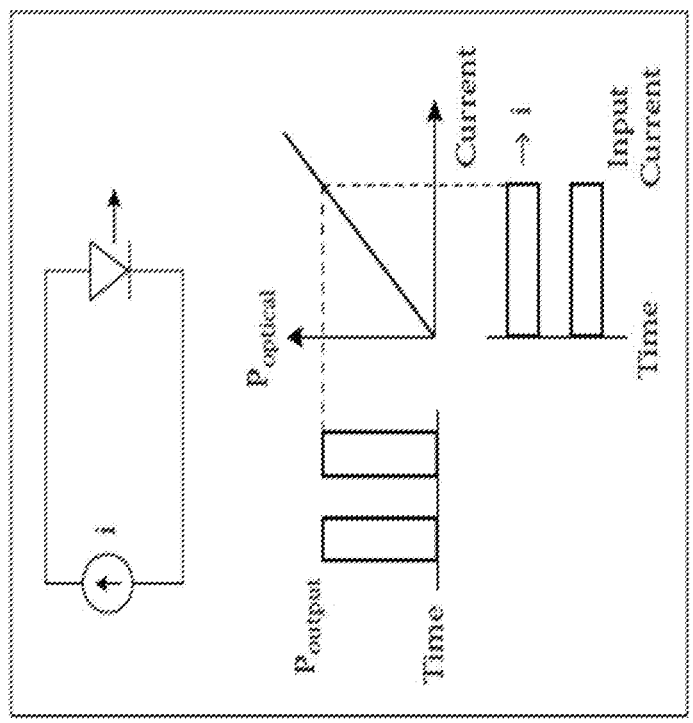

For LED based VLC and VLP system, in theory, an LED may be rapidly switched ON/OFF in a specific pattern encoded by a specific information (LED modulation). LED modulation embeds the intended information (i.e., the data) into the modulated light beam as visible light signals. In practical LED VLC systems, the LED is biased to emit light, and the emitted light may be modulated by the embedded electronic signals (i.e., information or data). FIGS. 7A-7B illustrate example LED modulation mechanisms. Typically, an LED illuminating device may be biased with a certain current. When the bias current reaches a certain level, the LED is turned on to emit a light. In digital modulation format (FIG. 7A), the driving current may be a current pulse with a specifically defined waveform, where a logic "0" means a "zero" modulation current (i.e., a low data current) and a logic "1" represents a "high" current (i.e., a stronger data current). This 0/1 logic bit train may be formed via modulation by the intended "data" to modulate the visible light signals emitted by an LED device.

Similarly, analog modulation (FIG. 7B) is controlled by an analog current waveform (signal). When the current strength of a biasing analog current is changed by the intended analog "data" waveform, it modulates the light beam emitted by the LED to send out the modulated visible light signals.

A VLC SoC system may comprise an integrated circuit fabricated on a first portion of a silicon substrate, and an LED fabricated from a compound semiconductor selectively grown on a second portion of the silicon substrate. The LED may be configured as a VLC transmitter. The compound semiconductor may be selectively grown on the second portion of the silicon substrate by (1) using a photo mask on the silicon substrate to define an opening; (2) depositing seeds into the opening; and (3) selectively growing the compound semiconductor in the opening. For example, the VLC SoC system may be fabricated as discussed above with respect to FIG. 6.

In some implementations, the compound semiconductor may comprise a direct bandgap semiconductor. In some implementations, the compound semiconductor may comprise GaN. In some implementations, a buffer layer may be grown between the compound semiconductor and the second portion of the silicon substrate.

The integrated circuit may comprise a VLC encoder and an LED driver. The VLC encoder may be configured to encode a VLC signal. In some implementations, the VLC encoder may comprise a Manchester encoder. The LED driver may be configured to drive the LED to emit visible light in accordance with the VLC signal.

Figure 8:
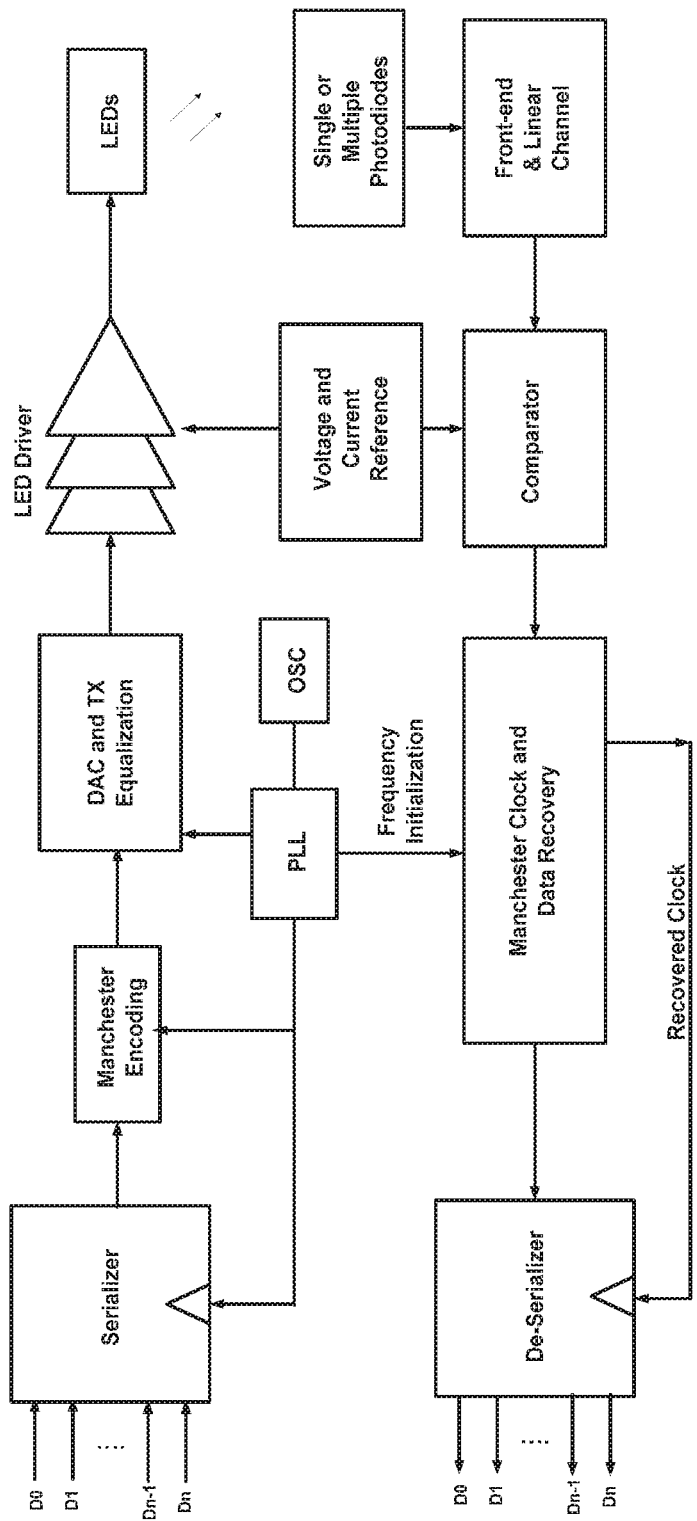
FIG. 8 illustrates an example block diagram for a transceiver SoC in accordance with some implementations of the disclosure.
Figure 9:
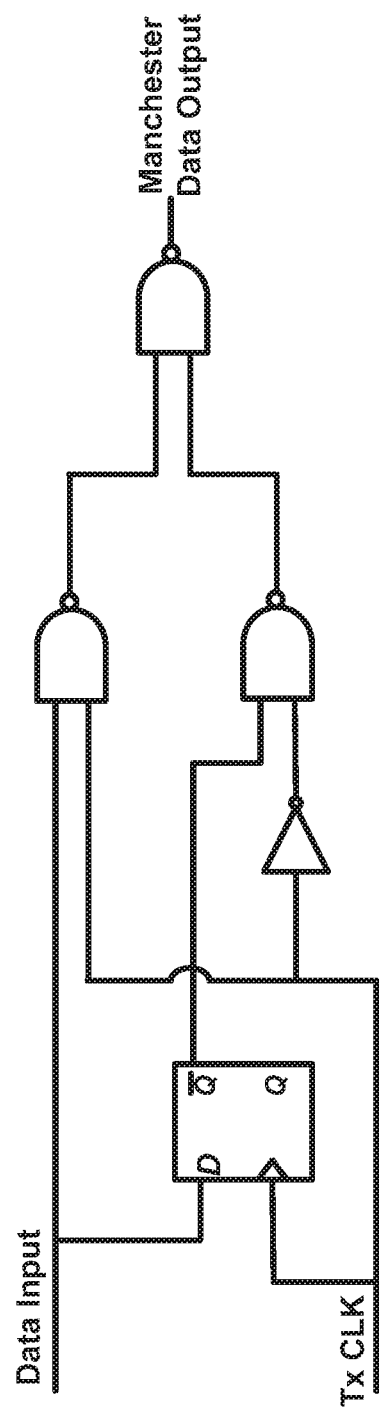
FIG. 9 illustrates an example Manchester encoder circuit in accordance with some implementations of the disclosure.
Figure 10:
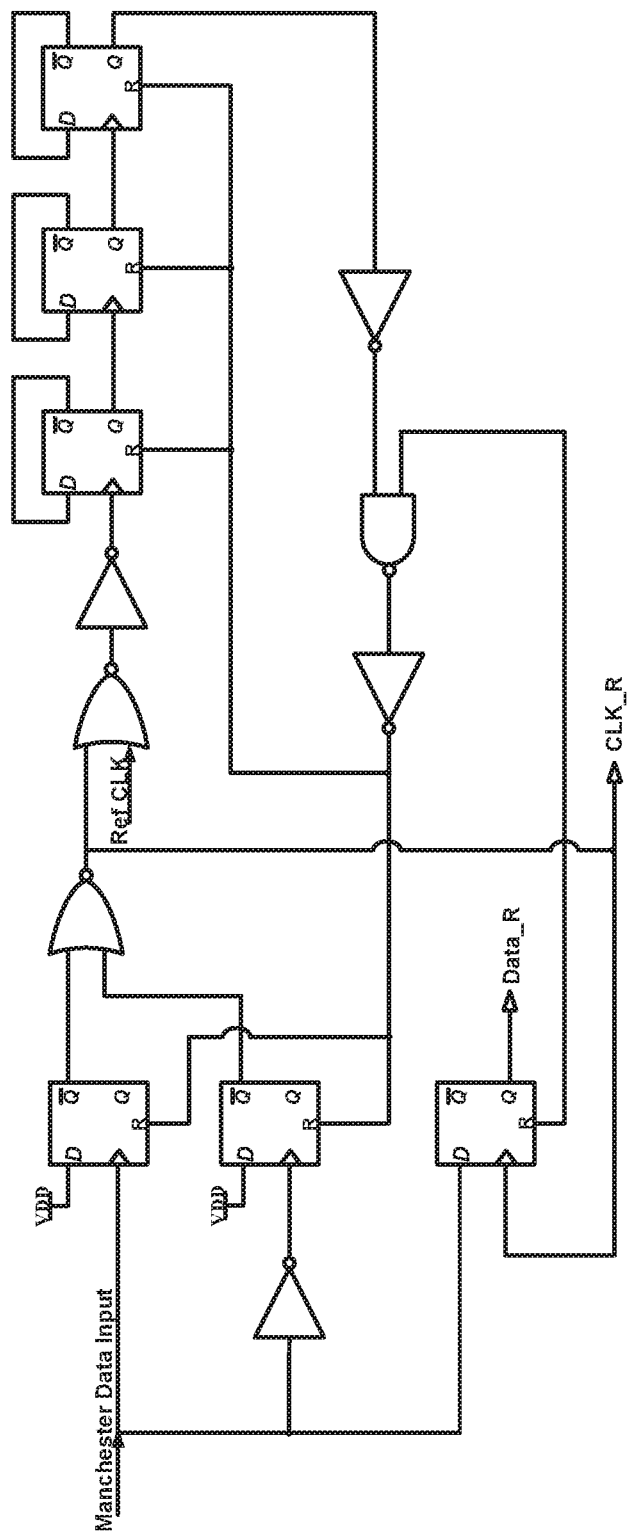
FIG. 10 illustrates an example Manchester decoder circuit in accordance with some implementations of the disclosure.

FIG. 8 shows an example block diagram for a transceiver SoC of VLC systems. The transceiver SoC may include transmitter and receiver integrated circuits. Manchester coding may be used to avoid the flickering effect, synchronize the data with the clock, and prevent low-frequency signals. A pre-equalization circuit may be used to enlarge the modulation bandwidth of LEDs. In a transmitter channel, a Manchester coding method may be used for LED modulation (i.e., use a specific data information to modulate an LED). This may be accomplished by using a Manchester encoder circuit. An example Manchester encoder circuit is shown in FIG. 9. In a receiver channel, a reverse function may be performed to demodulate the received visible light signals to recover the specific Clock and Data signals embedded in the modulated light from an LED. A Manchester decoding method may be used for clock and data recovery (CDR) to extract the "information" carried on the light. This may be accomplished by using a Manchester decoder circuit. An example Manchester decoder circuit is shown in FIG. 10.

Figure 11:
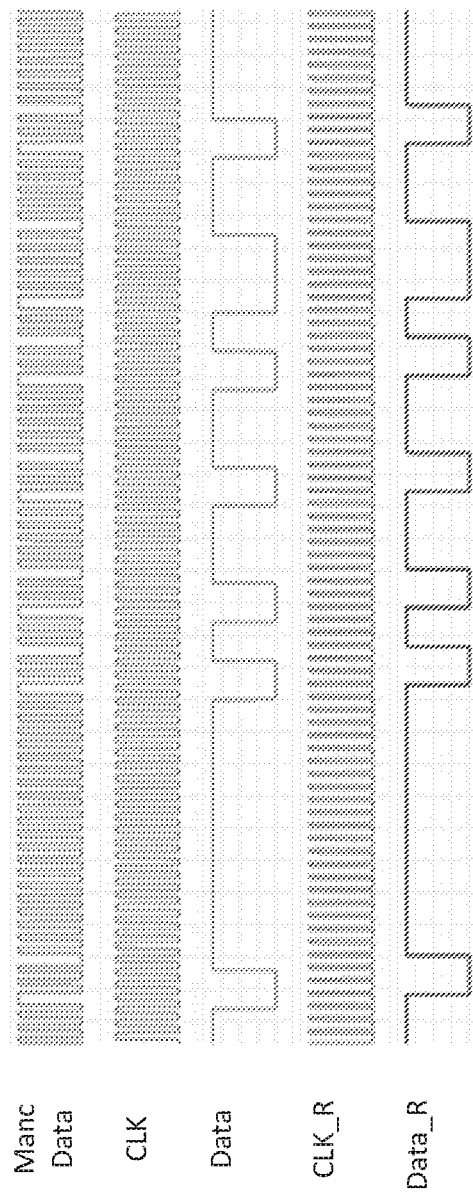
FIG. 11 illustrates example signal waveforms for Manchester encoders and/or decoders in accordance with some implementations of the disclosure.

FIG. 11 shows example signal waveforms for Manchester encoder and decoder. The example waveforms include reference clock signals (CLK), data signals (Data)—intended data information to be carried on an emitted LED light, LED signal modulated by Manchester coding (Manc Data), a clock signal recovered by Manchester decoding (CLK_R), and data signals recovered by Manchester decoding (Data_R).

Figure 12B:
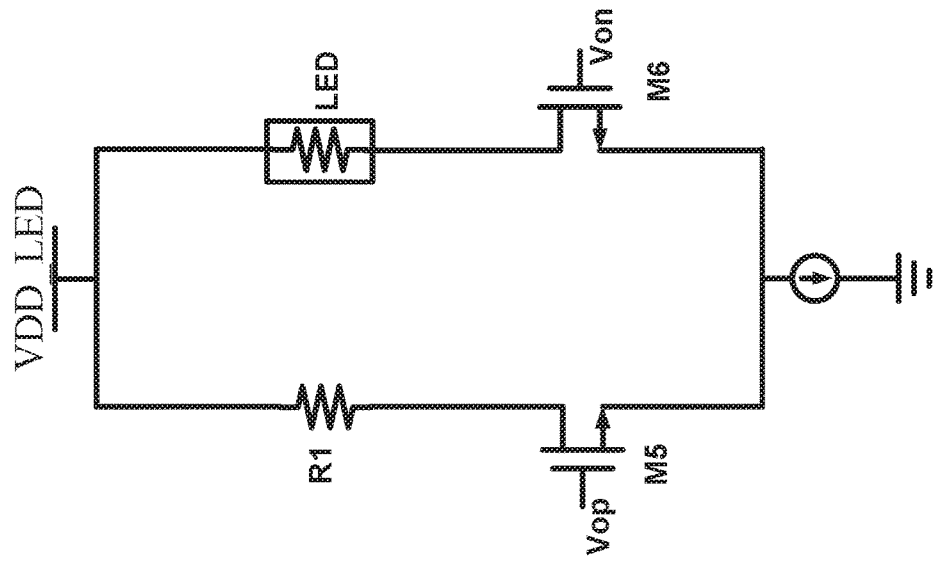
FIGS. 12A-12B illustrate example schematics for LED driver circuit in accordance with some implementations of the disclosure.
Figure 12A:
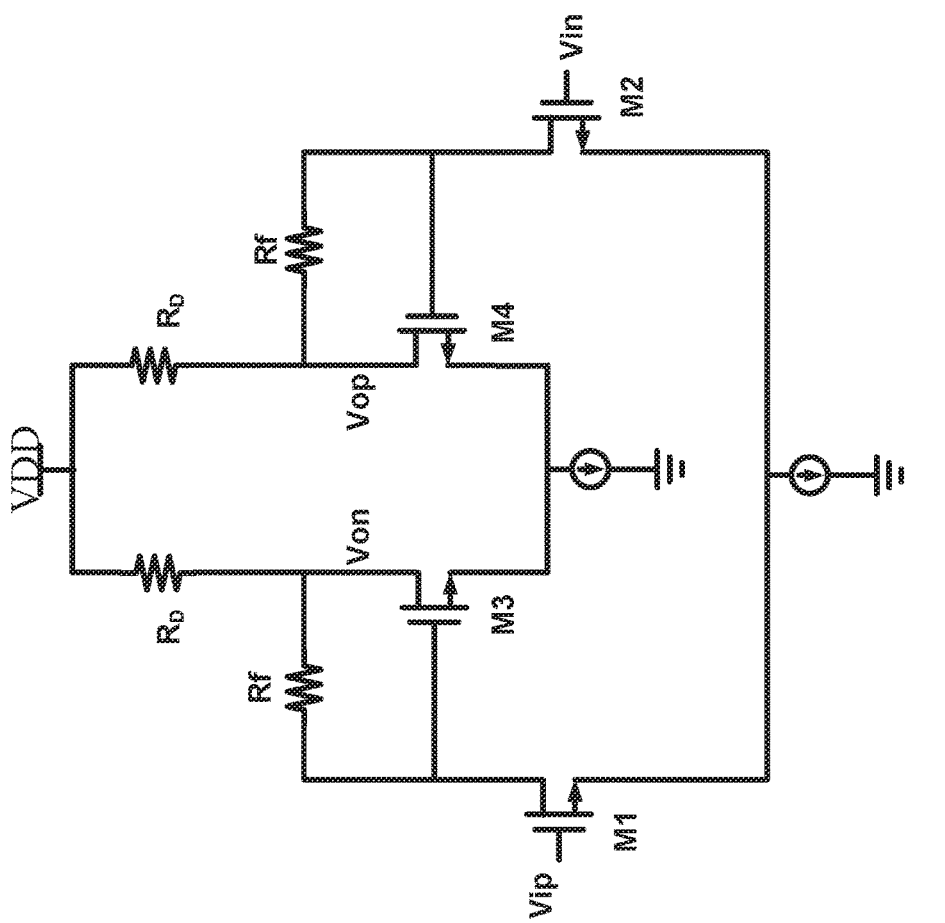

FIGS. 12A-12B show example schematics for LED driver circuit. FIG. 12A may include a cherry hooper amplifier. FIG. 12B may include a CML output stage for TAP/MAIN buffers. Other designs for LED driver circuit are contemplated.

In some implementations, the integrated circuit may further comprise a serializer to serialize the VLC signals. In some implementations, the integrated circuit may further comprise a pre-equalizer using an overshoot/undershoot circuit configured to accelerate charging and discharging of the LED to enhance its modulation bandwidth. In some implementations, the integrated circuit may further comprise an active feedback based ambient light cancellation circuit. The active feedback based ambient light cancellation circuit may comprise a low pass filter, an error amplifier, and an NMOSFET. The active feedback based ambient light cancellation circuit may comprise an active feedback transimpedance amplifier (TIA) ambient light cancellation circuit.

Figure 13:
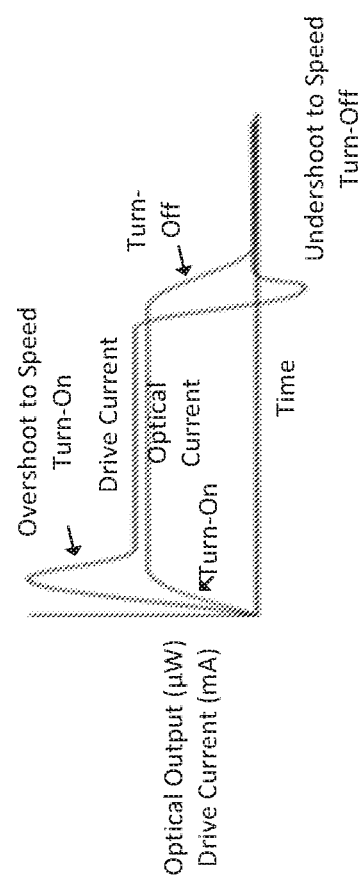
FIG. 13 illustrates an example equalizer waveform featuring an overshoot and an undershoot in accordance with some implementations of the disclosure.

A pre-equalization circuit may be used to enlarge the modulation bandwidth of LEDs. Since the LED modulation bandwidth is determined by the rise/fall time of the driving current, an overshoot/undershoot technique may be used to accelerate the turn-on (charging) and then turn-off (discharging) of an LED for a wider bandwidth. FIG. 13 shows an example equalizer waveform featuring an overshoot at the rising time and an undershoot at the falling time. The overshoot and the undershoot speed up the charging and discharging procedures of an LED and make the LED modulation bandwidth wider.

Figure 14:
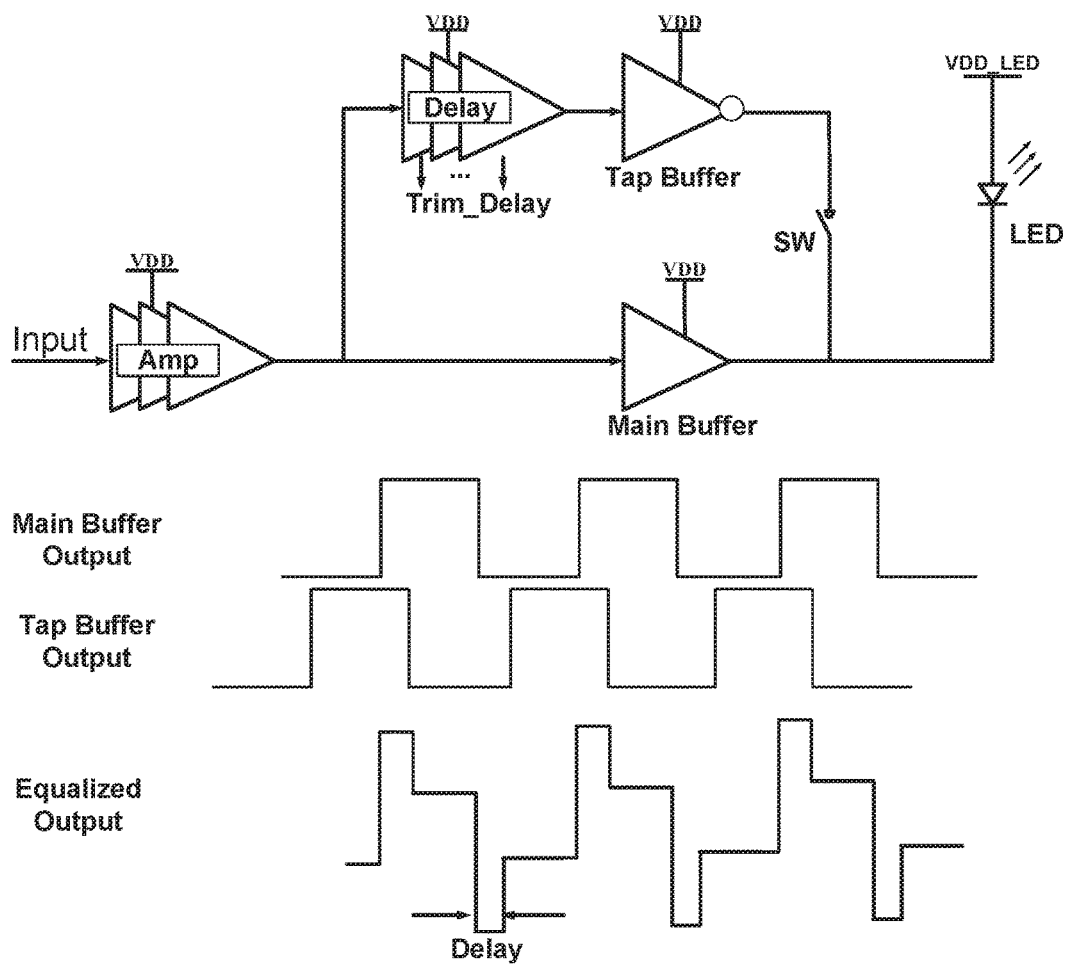
FIG. 14 illustrates an example schematic for a Feed-Forward Equalizer circuit in accordance with some implementations of the disclosure.

FIG. 14 shows an example schematic for a Feed-Forward Equalizer circuit inside a VLC transmitter integrated circuit. The Tap Buffer and Main Buffer in FIG. 14 may use a common-mode logic (CML) circuit shown in FIG. 12(b). The main LED driver amplifier in FIG. 14 may use a circuit schematic shown in FIG. 12(a). FIG. 14 may include an integrated driver and equalizer circuit for an LED. In FIG. 14, a trimmable delay line may program the timing of the Tap Buffer. The output waveforms from the Tap Buffer and the Main Buffer may be combined to produce the Equalized Output waveform with overshot and undershot features (e.g., shown in FIG. 13) to speed up the electronic carrier charging and discharging of an LED device, resulting in a wider LED modulation bandwidth.

Figure 15A:
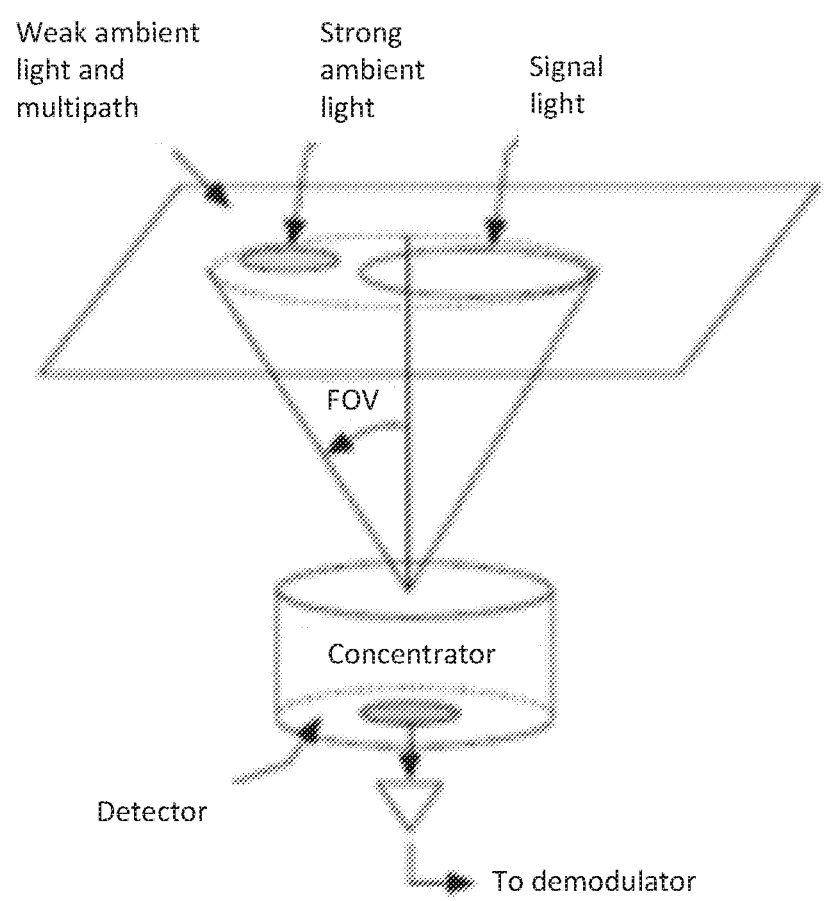
FIGS. 15A-15C illustrate example configurations for optical receiver in accordance with some implementations of the disclosure.
Figure 15B:
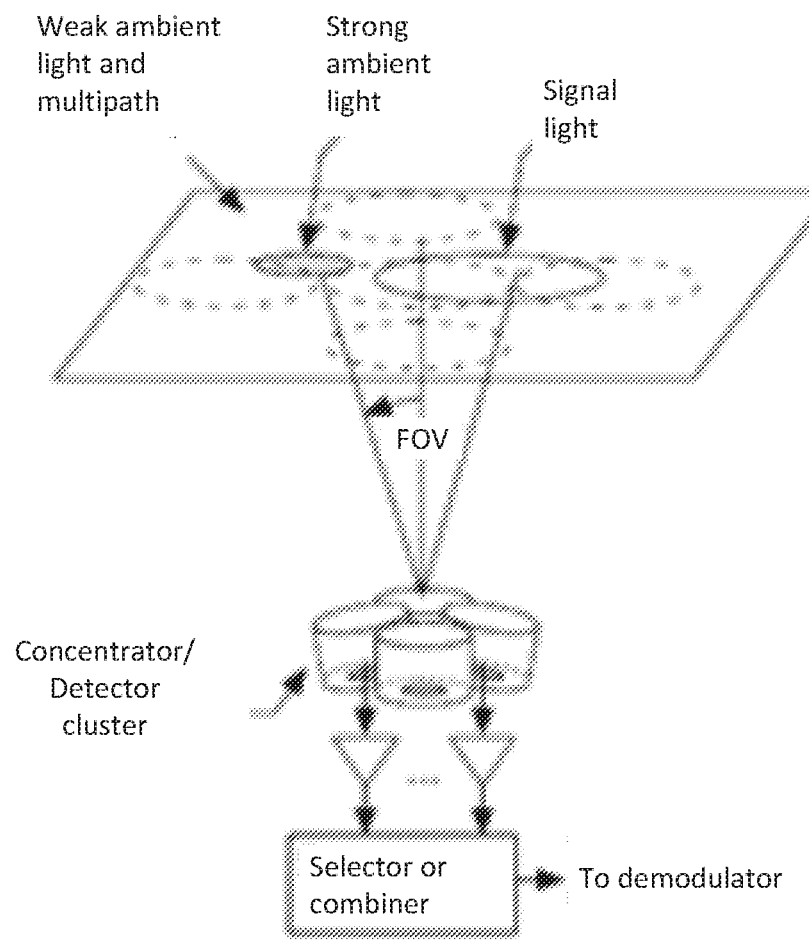
Figure 15C:
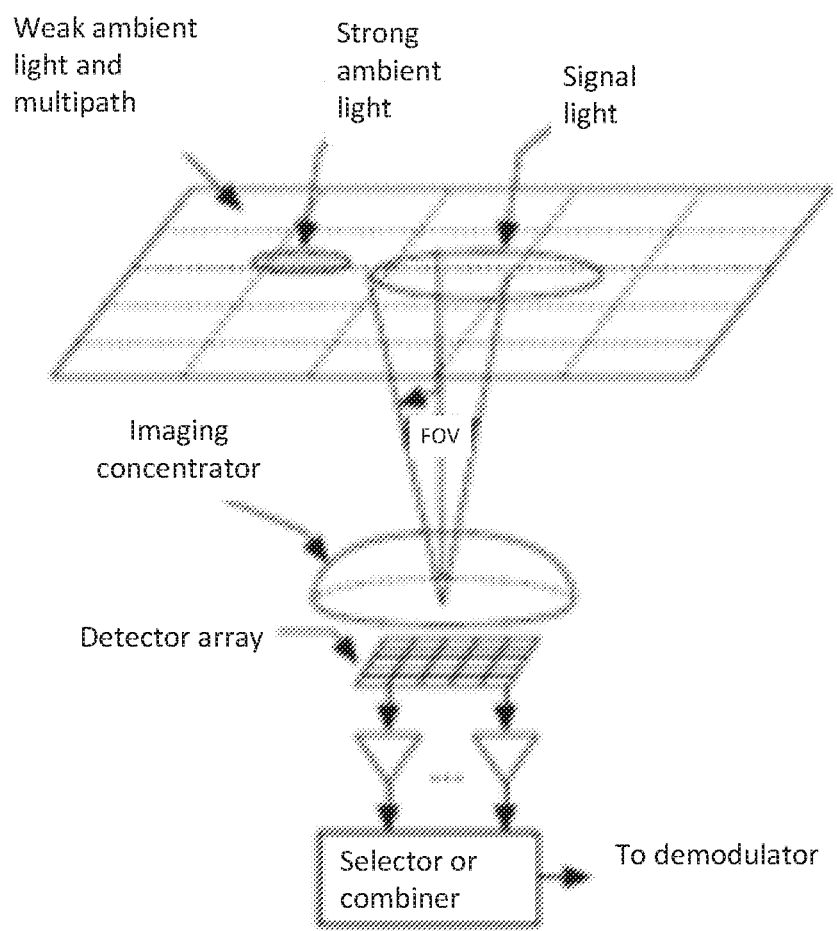

FIGS. 15A-15C show three example configurations for an optical receiver. FIG. 15A shows an example single-element receiver. A single-element receiver, consisting of a light concentrator, optical filter and PD, receives light from a wide field of view (FOV) without differentiating the desired light signal and ambient light noises. The single-element receiver suffers from multipath distortion due to reflected light from different surfaces.

FIG. 15B shows an example angle-diversity receiver. An angle-diversity receiver can overcome the problems of the single-element receiver because it utilizes multiple receiving elements with narrower field of view pointing to different directions. This may greatly reduce ambient light, interferences and multipath distortion. Narrower field of view also allows smaller PDs (lower capacitance), and provide for a wider receiver bandwidth and lower thermal noise of the preamplifier. However, the angle-diversity receiver may increase receiver size and costs due to using multiple optical concentrators.

FIG. 15C shows an imaging angle-diversity receiver. An imaging angle-diversity receiver that utilizes only one optical concentrator can resolve the problems of the angle-diversity receiver. An imaging angle-diversity receiver may be readily implemented in low-cost CMOS.

At the receiver end, unavoidable ambient light (i.e., noise) may easily saturate the input to a preamplifier of a PD. These ambient background light noises may be at DC or low frequency. A traditional solution to this ambient light problem is to add a passive resistance-capacitance (RC) high-pass filter to block the DC and low-frequency background light noises in a mainly discrete receiver system. However, its drawbacks are clear. For example, the large resistance and capacitance values reduce the frequency bandwidth of the PD channel, and large resistor and capacitor components are not suitable for integrated circuits.

Figure 16:
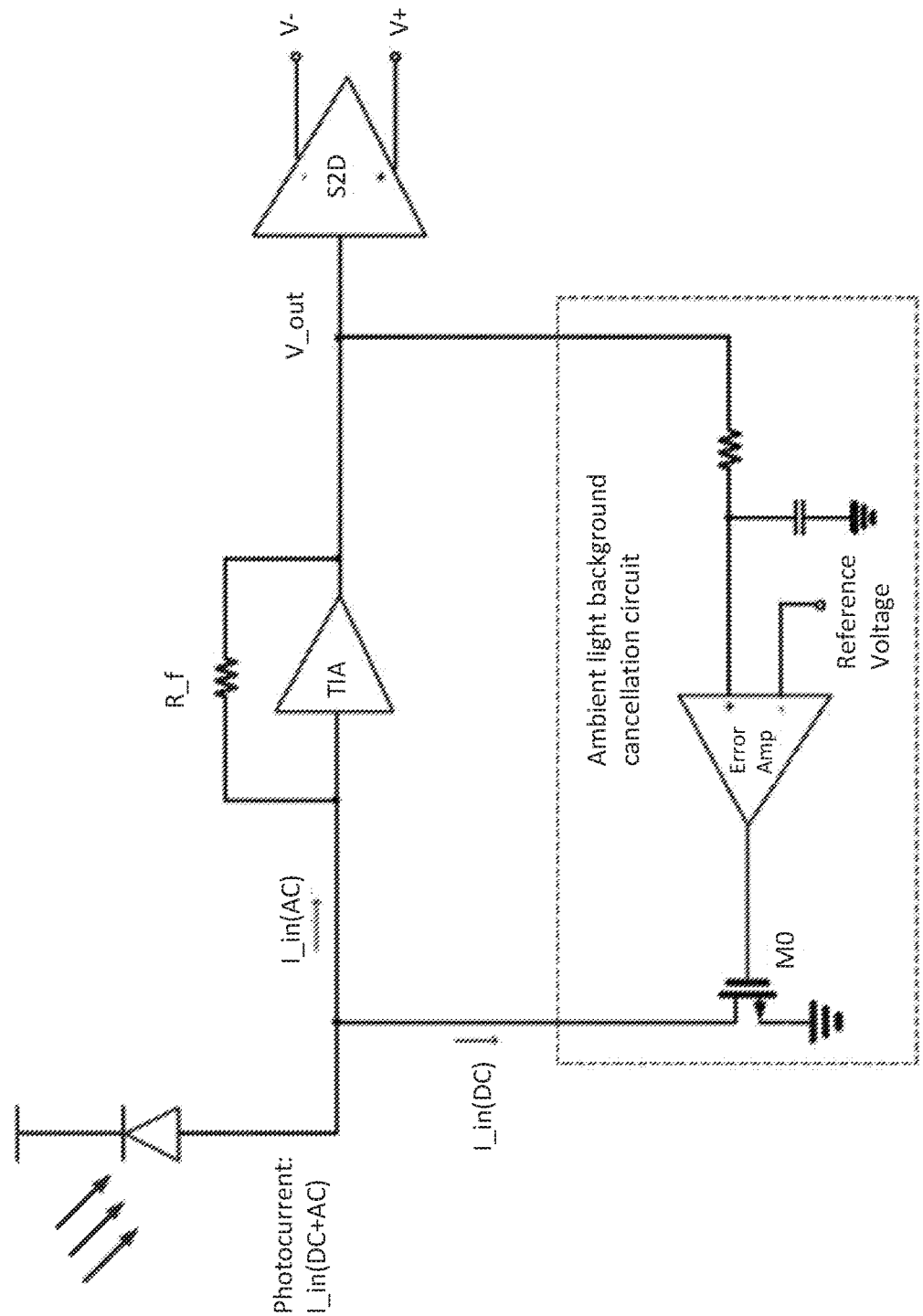
FIG. 16 illustrates an example active feedback transimpedance amplifier (TIA) ambient light cancellation circuitry in accordance with some implementations of the disclosure.

FIG. 16 shows an example active feedback trans-impedance amplifier (TIA) ambient light cancellation circuitry. An active feedback trans-impedance amplifier (TIA) ambient light cancellation circuitry may be used to remove background light noises. The active feedback based ambient light cancellation circuit includes a low pass filter, an error amplifier and a NMOSFET (MO). The NMOSFET acts as voltage controlled current source. A strong DC ambient noise (e.g., from sunlight, fluorescent or incandescent lights) may be sensed by an error amplifier, which can turn on the NMOSFET to sink the large ambient light current. This may provide ambient light noise cancellation.

Figure 15D:
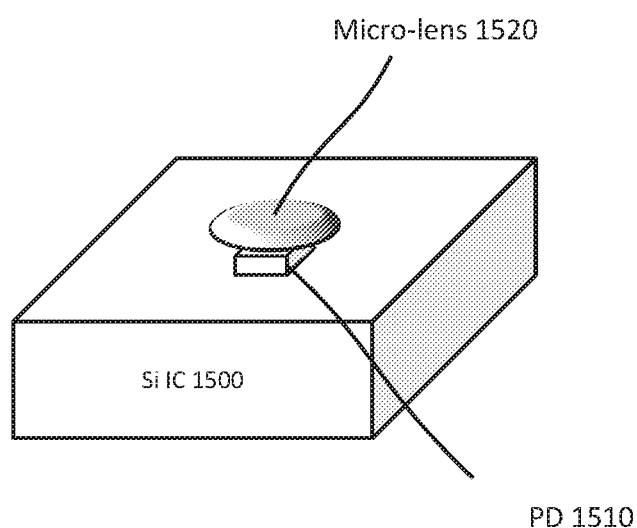
FIG. 15D illustrates an example VLC receiver with a micro-lens integrated directly on top of the PD in accordance with some implementations of the disclosure.

A VLC receiver may include an optical filter, a PD, a pre-amplifier with automatic gain control feature, a Manchester decoder, and/or other components. A VLC receiver may include an integrated micro lens filter on top of a PD to enlarge the PD bandwidth. The narrow bandwidth of a PD may be limited by the slow response of the yellow phosphor used in an LED emitter device (e.g., PD in a receiver). One solution may be to use an optical bandpass filter (discrete) in front of a PD in the receiver channel to receive the blue light only. This enhances the frequency bandwidth of a PD. A micro-lens type optical filter may be integrated directly on top of the PD. The micro-lens type optical filter may function as an optical bandpass filter on top of the PD. The micro-lens type optical filter may be fabricated with IC fabrication method (e.g., using transparent thin film or organic transparent lens), which may be integrated with the PD using standard IC fabrication process. FIG. 15D shows an example VLC receiver with an micro-lens integrated directly on top of a PD. As shown in FIG. 15D, a PD 1510 may be fabricated in/integrated with a Si IC 1500. Micro-lens 1520 may be integrated on top of the PD 1510. The integrated micro-lens filter (e.g., 1520) and small-size PD pixel(s) may provide high performance with low costs.

Figure 17:
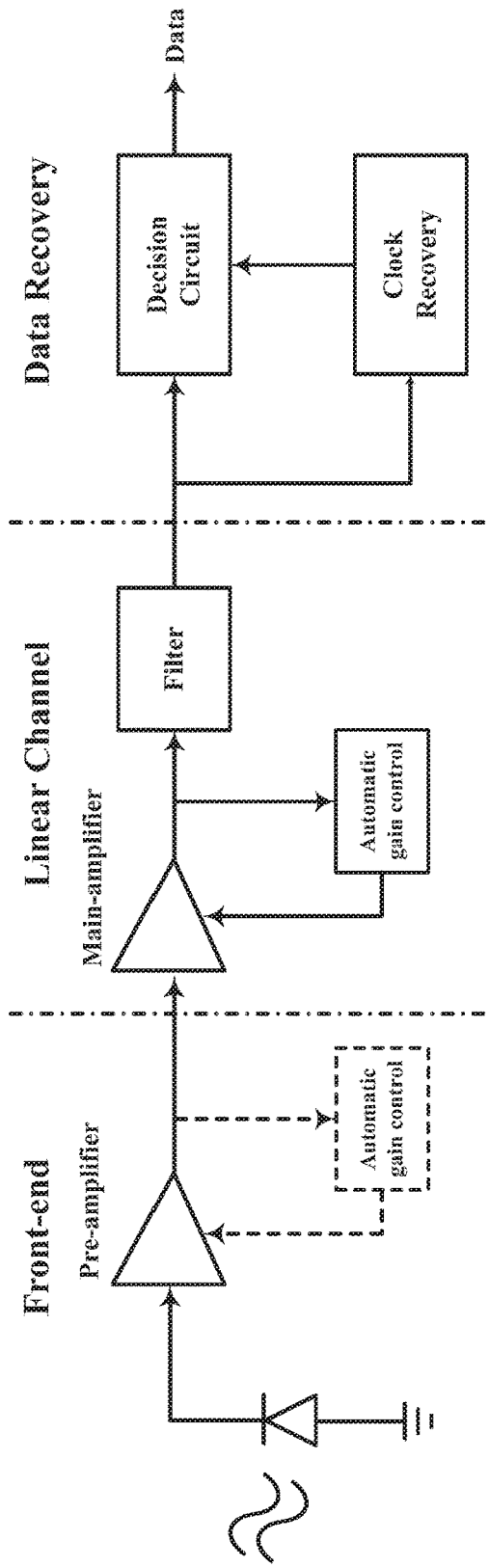
FIG. 17 illustrates example amplification block in accordance with some implementations of the disclosure.
Figure 18A:
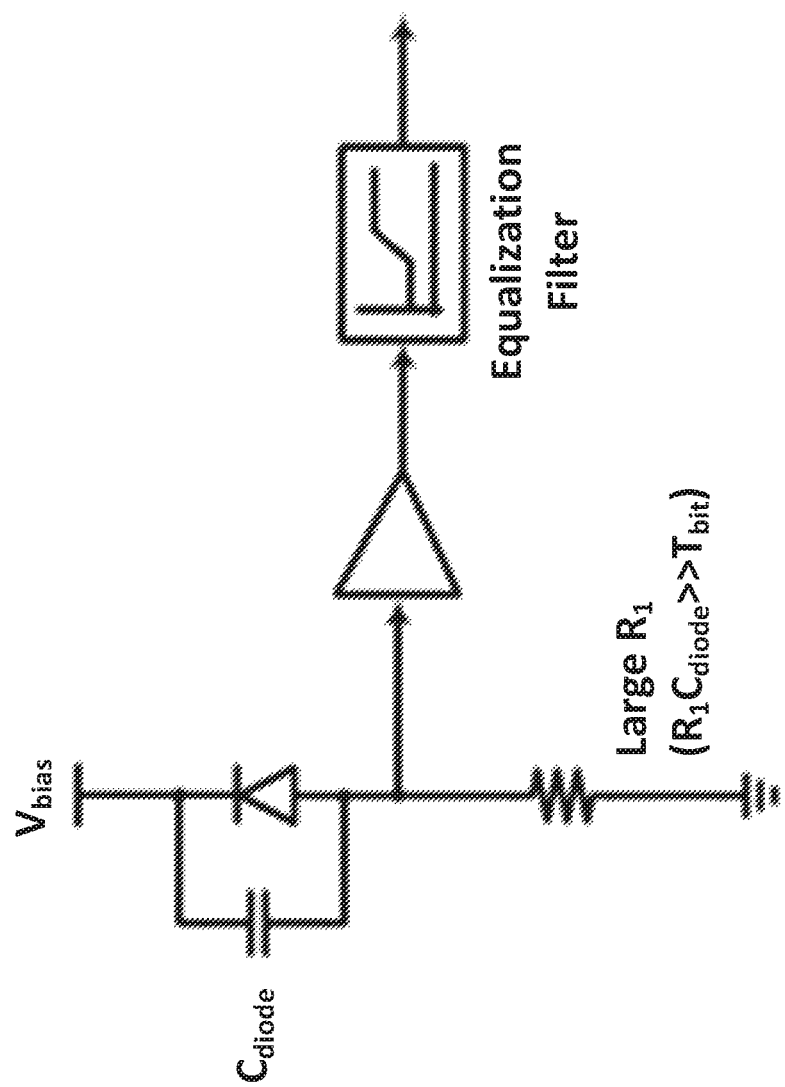
FIGS. 18A-18C illustrate example amplifier circuit topologies for a pre-amplifier in accordance with some implementations of the disclosure.
Figure 18B:
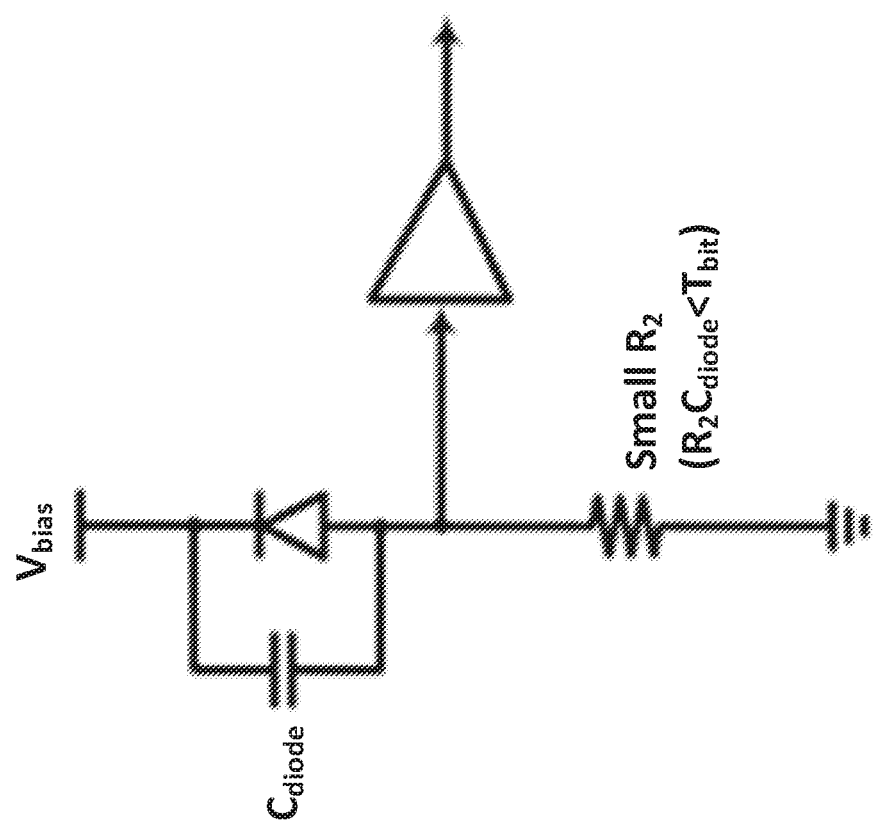
Figure 18C:
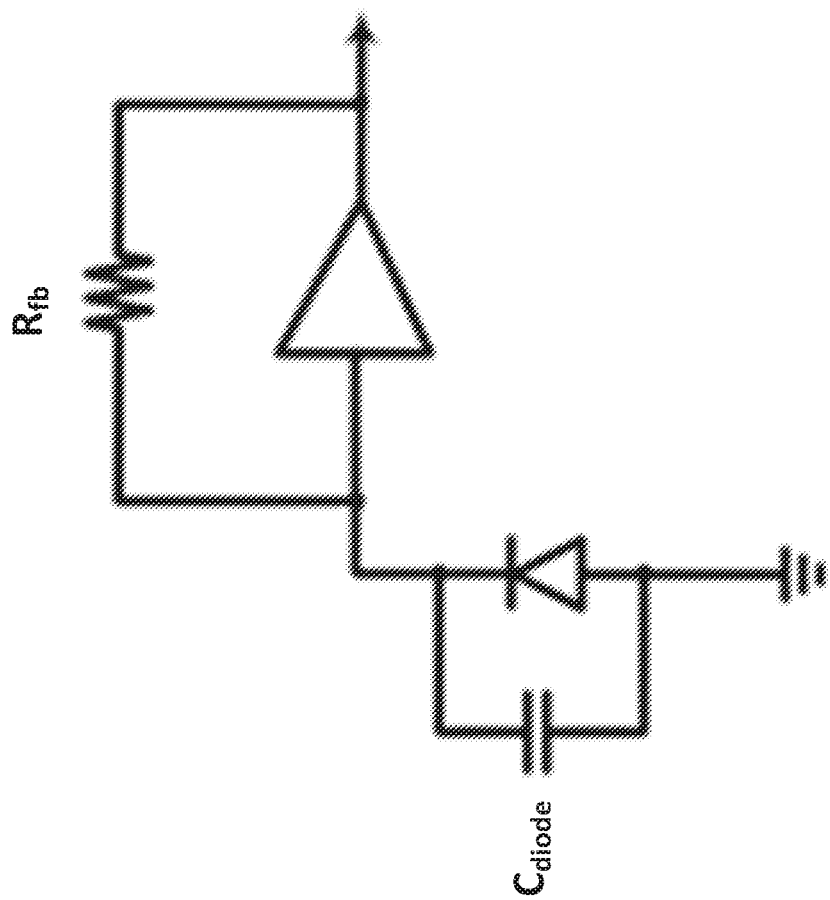

FIG. 17 shows an example amplification block after a PD. A pre-amplifier circuit with automatic gain control feature may follow the PD. FIGS. 18A-18C show example types of amplifier circuit topologies for the pre-amplifier. FIG. 18A shows an example high-impedance amplifier. FIG. 18B shows an example low-impedance amplifier. FIG. 18C shows an example trans-impedance amplifier. The automatic gain control function may be realized using a feedback trans-impedance amplifier (TIA) to achieve ambient noise light cancellation as shown in FIG. 16.

In some implementations, the VLC SoC/SiP system may further comprise a photodetector. The photodetector may be fabricated in the compound semiconductor selectively grown on the second portion of the silicon substrate (e.g., as discussed above with respect to FIG. 6). In some implementations, the photodetector may be fabricated directly on the silicon substrate. The photodetector may be fabricated directly on the silicon substrate without/before growing the compound semiconductor. The photodetector may be fabricated directly on the part of the silicon substrate where the compound semiconductor has not been grown. The photodetector may be configured as a VLC receiver to receive the VLC signal, and the integrated circuit may be configured to process the VLC signal received by the photodetector.

Figure 19:
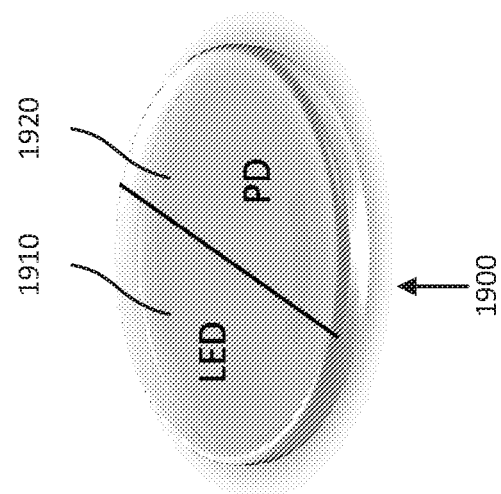
FIG. 19 illustrates splitting an LED die into two parts in accordance with some implementations of the disclosure.

An LED device and a PD device may be made on one GaN die by patterning. For example, as shown in FIG. 19, a GaN die 1900 may be split into an LED portion 1910 and a PD portion 1920. Each device may be optimized for performance of LED and PD, respectively. For example, the LED device may be optimized for high light mission efficiency and high light power, while the PD device may be optimized for high sensitivity. When using VLC system in a smartphone/tablet, an LED flashlight can serve as the LED light emitter and a new PD device can be added into the smartphone. Using the LED+PD method, a standard flashlight LED in a smartphone may be partitioned as shown in FIG. 19. Thus, one LED+PD GaN die is sufficient.

Figure 20:
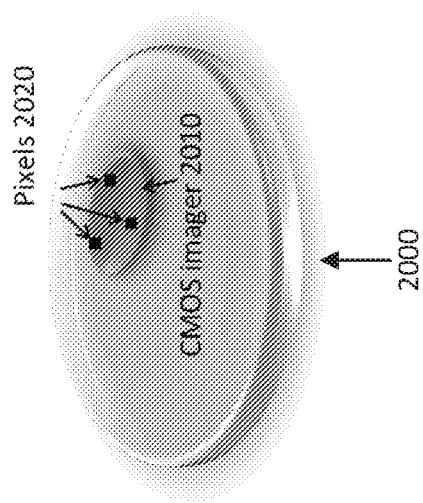
FIG. 20 illustrates modifying CMOS imager to contain PD devices as light receivers in accordance with some implementations of the disclosure.

For smartphone/tablet based VLC system, the CMOS imager device for the camera of the smartphone/tablet may be modified to contain one or more PD devices. As shown in FIG. 20, one or more pixels 2020 of the CMOS imager 2010 (built on a substrate 2000) may be optimized for PD functions. This allows smartphones/tablets to use VLC without installing additional PDs. The substrate 2000 may include integrated circuits for the VLC system. In some implementations, the pixels 2020 of the CMOS imager 2010 may be reconfigurable photodetectors. This may allow the use of different PDs at different locations to adapt to background light noise by field programming.

Spatially relative terms such as "under," "below," "lower," "over," "upper," "left," "right," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A method of making a visible light communication (VLC) system-on-a-chip (SoC) system, comprising:
    fabricating an integrated circuit comprising a VLC encoder and an LED driver on a first portion of a silicon substrate;
    selectively growing a compound semiconductor on a second portion of the silicon substrate; and
    fabricating an LED in the compound semiconductor selectively grown on the second portion of the silicon substrate;
    wherein the LED is configured as a VLC transmitter, the VLC encoder is configured to encode a VLC signal, and the LED driver is configured to drive the LED to emit visible light in accordance with the VLC signal; and
    wherein the integrated circuit further comprises an active feedback based ambient light cancellation circuit comprising a low pass filter, an error amplifier, and an NMOSFET.

2. The method of claim 1, wherein the step of selectively growing the compound semiconductor on the second portion of the silicon substrate comprises:
    using a photo mask on the silicon substrate to define an opening;
    depositing seeds into the opening; and
    selectively growing the compound semiconductor in the opening.

3. The method of claim 1, further comprising:
    growing a buffer layer between the compound semiconductor and the second portion of the silicon substrate.

4. The method of claim 1, wherein the VLC encoder comprises a Manchester encoder.

5. The method of claim 1, wherein the integrated circuit further comprises a serializer for serializing the VLC signal.

6. The method of claim 1, the integrated circuit further comprises a pre-equalizer using an overshoot/undershoot circuit configured to accelerate charging and discharging of the LED.

7. The method of claim 1, further comprising:
    fabricating a photodetector in the compound semiconductor selectively grown on the second portion of the silicon substrate, or fabricating the photodetector in the same silicon substrate;
    wherein the photodetector is configured as a VLC receiver to receive the VLC signal, and the integrated circuit is configured to decode the VLC signal received by the photodetector.

8. The method of claim 7, further comprising:
    integrating a micro-lens on top of the photodetector.

9. The method of claim 1, further comprising:
    fabricating a photodetector on the first portion of a silicon substrate;
    integrating a micro-lens on top of the photodetector;
    wherein the photodetector is configured as a VLC receiver to receive the VLC signal, and the integrated circuit is configured to decode the VLC signal received by the photodetector.

10. A visible light communication (VLC) system-on-a-chip (SoC) system, comprising:
    an integrated circuit comprising a VLC encoder and an LED driver fabricated on a first portion of a silicon substrate; and
    an LED fabricated in a compound semiconductor selectively grown on a second portion of the silicon substrate;
    wherein the LED is configured as a VLC transmitter, the VLC encoder is configured to encode a VLC signal, and the LED driver is configured to drive the LED to emit visible light in accordance with the VLC signal;
    wherein the integrated circuit further comprises an active feedback based ambient light cancellation circuit comprising a low pass filter, an error amplifier, and an NMOSFET.

11. The system of claim 10, wherein the system is a single chip integrated circuit.

12. The system of claim 10, further comprising a buffer layer between the compound semiconductor and the second portion of the silicon substrate.

13. The system of claim 10, wherein the VLC encoder comprises a Manchester encoder.

14. The system of claim 10, wherein the integrated circuit further comprises a serializer for serializing the VLC signal.

15. The system of claim 10, wherein the integrated circuit further comprises pre-equalizer using an overshoot/undershoot circuit configured to accelerate charging and discharging of the LED.

16. The system of claim 10, further comprising:
a photodetector fabricated in the compound semiconductor selectively grown on the second portion of the silicon substrate;
wherein the photodetector is configured as a VLC receiver to receive the VLC signal, and the integrated circuit is configured to process the VLC signal received by the photodetector.

17. The system of claim 16, further comprising:
a micro-lens integrated on top of the photodetector.

18. The system of claim 10, further comprising:
a photodetector fabricated on the first portion of the silicon substrate; and
a micro-lens integrated on top of the photodetector;
wherein the photodetector is configured as a VLC receiver to receive the VLC signal, and the integrated circuit is configured to decode the VLC signal received by the photodetector.

19. A method of making a visible light communication (VLC) System-in-Package (SiP) system, comprising:
fabricating an integrated circuit comprising a VLC encoder and an LED driver on a silicon substrate;
fabricating an LED in a compound semiconductor;
packaging the integrated circuit and the LED in a SiP module; and
forming interconnects between the integrated circuit and the LED;
wherein the LED is configured as a VLC transmitter, the VLC encoder is configured to encode a VLC signal, and the LED driver is configured to drive the LED to emit visible light in accordance with the VLC signal;
wherein the integrated circuit further comprises an active feedback based ambient light cancellation circuit comprising a low pass filter, an error amplifier, and an NMOSFET.

20. The method of claim 19, further comprising packaging the integrated circuit and the LED in a SiP module using a flip-chip method.

21. The method of claim 19, wherein the interconnects comprise through-silicon vias and an interposer layer.

22. The method of claim 19, wherein the VLC encoder comprises a Manchester encoder.

23. The method of claim 19, wherein the integrated circuit comprises a serializer for serializing the VLC signal.

24. The method of claim 19, wherein the integrated circuit further comprises a pre-equalizer using an overshoot/undershoot circuit configured to accelerate charging and discharging of the LED.

25. The method of claim 19, further comprising:
fabricating a photodetector in the compound semiconductor, wherein the photodetector is configured as a VLC receiver to receive the VLC signal, and the integrated circuit is configured to decode the VLC signal received by the photodetector.

26. The method of claim 25, further comprising:
integrating a micro-lens on top of the photodetector.

27. The method of claim 19, further comprising:
fabricating a photodetector on the silicon substrate;
integrating a micro-lens on top of the photodetector;
wherein the photodetector is configured as a VLC receiver to receive the VLC signal, and the integrated circuit is configured to decode the VLC signal received by the photodetector.

28. A visible light communication (VLC) System-in-Package (SiP) system, comprising:
an integrated circuit comprising a VLC encoder and an LED driver fabricated on a silicon substrate;
an LED fabricated in a compound semiconductor; and
interconnects formed between the integrated circuit and the LED;
wherein the integrated circuit and the LED are packaged in a SiP module;
wherein the LED is configured as a VLC transmitter, the VLC encoder is configured to encode a VLC signal, and the LED driver is configured to drive the LED to emit visible light in accordance with the VLC signal;
wherein the integrated circuit further comprises an active feedback based ambient light cancellation circuit comprising a low pass filter, an error amplifier, and an NMOSFET.

29. The system of claim 28, wherein the SiP module is packaged using a flip-chip method.

30. The system of claim 28, wherein the interconnects comprise through-silicon vias and an interposer layer.

31. The system of claim 28, wherein the VLC encoder comprises a Manchester encoder.

32. The system of claim 28, wherein the integrated circuit comprises a serializer for serializing the VLC signal.

33. The system of claim 28, wherein the integrated circuit further comprises a pre-equalizer using an overshoot/undershoot circuit configured to accelerate charging and discharging of the LED.

34. The system of claim 28, further comprising:
a photodetector fabricated in the compound semiconductor, wherein the photodetector is configured as a VLC receiver to receive the VLC signal, and the integrated circuit is configured to process the VLC signal received by the photodetector.

35. The system of claim 34, further comprising:
a micro-lens integrated on top of the photodetector.

36. The system of claim 28, further comprising:
a photodetector fabricated on the silicon substrate;
a micro-lens integrated on top of the photodetector;
wherein the photodetector is configured as a VLC receiver to receive the VLC signal, and the integrated circuit is configured to decode the VLC signal received by the photodetector.

* * * * *